Sept. 8, 1964 A. W. THEILIG 3,147,738
EGG INCUBATING TRAY WITH RACK AND PALLET
Original Filed Aug. 11, 1961 8 Sheets-Sheet 1

INVENTOR.
ARTHUR W. THEILIG
BY
Wheeler, Wheeler & Wheeler
ATTORNEYS.

Sept. 8, 1964 A. W. THEILIG 3,147,738
EGG INCUBATING TRAY WITH RACK AND PALLET
Original Filed Aug. 11, 1961 8 Sheets-Sheet 2

INVENTOR.
ARTHUR W. THEILIG
BY
Wheeler, Wheeler + Wheeler
ATTORNEYS

Sept. 8, 1964 A. W. THEILIG 3,147,738
EGG INCUBATING TRAY WITH RACK AND PALLET
Original Filed Aug. 11, 1961 8 Sheets-Sheet 6

INVENTOR.
ARTHUR W. THEILIG
BY
Wheeler, Wheeler & Wheeler
ATTORNEYS

United States Patent Office 3,147,738
Patented Sept. 8, 1964

3,147,738
EGG INCUBATING TRAY WITH RACK
AND PALLET
Arthur W. Theilig, Fort Atkinson, Wis., assignor to Rockwood & Co., Chicago, Ill., a corporation of Delaware
Original application Aug. 11, 1961, Ser. No. 130,819. Divided and this application Aug. 30, 1962, Ser. No. 226,762
9 Claims. (Cl. 119—43)

This invention relates to an apparatus for incubating eggs and to auxiliary apparatus used in connection therewith.

This application is a division of my copending application Serial No. 130,819, filed August 11, 1961.

One of the best known and most successful prior art techniques of incubating eggs is the subject of United States Patent 2,603,182. In the incubator of the said patent, all of the eggs are placed in the incubator at the same time, all eggs progress concurrently through the various stages of incubation and all are removed together after incubation.

Eggs require heat in the early stages of incubation (for chicken eggs, the first fourteen days) and will give off heat in the final stages of incubation (the last seven days), and will require oxygen and release carbon dioxide in all stages of incubation. This means that eggs in different stages of incubation require different ambient temperature conditions for proper hatching. Inasmuch as all of the eggs in the prior art incubator aforesaid are at the same stage of incubation, temperature conditions within the incubator can be very closely controlled through the different stages of incubation and will result in a high percentage of hatchability of the eggs therein.

Another technique of incubation is to use very large incubators, which contain eggs in different stages of incubation. Each egg tray must be clearly marked so that it will be taken out of the incubator at the appropriate time (on the eighteenth day of incubation in the case of chicken eggs) and shifted to a hatcher. An advantage of a multi-stage incubator is that the heat which is given off by the eggs in their final stage of incubation is absorbed by eggs in the initial stage of incubation so that the overall requirements for heat are reduced. However, multistage incubators are subject to the difficulty of maintaining accurate control over the temperature in the vicinity of any egg tray and in prior art multistage incubators known to me, the attempt is made only to maintain the average temperature constant without regard to the precise temperature requirements of the eggs in their various stages of incubation.

The incubator of the present invention achieves the advantages of close control over the actual temperature of the eggs in their various stages of incubation and at the same time employs an entirely new concept of organizing and handling the eggs within the incubator to expedite transfer of heat from late stage eggs to early stage eggs. Thus the advantages of multi-stage incubation are achieved without loss of control over the temperature of eggs in their different stages of incubation.

This is accomplished by arranging egg racks in the incubator cabinet in rows according to the stage of incubation of the eggs in the rack and circulating the air around the eggs in a pattern in which the air will flow from the late stage eggs to the early stage eggs, thus to transfer heat from those eggs giving off heat to those which will absorb it. This reduces the heat demand of the incubator cabinet very materially and yet the temperature of each rack of eggs can be very closely controlled at the optimum value according to the stage of incubation thereof.

The present invention also employs an entirely new concept in handling the eggs to eliminate transfer thereof from one container to another. An entirely new egg tray is used in which the eggs are placed in the laying house where the eggs are gathered. This egg tray is transferred bodily to the incubator and the eggs need not be touched again until they are removed from the incubator and transferred to the hatcher. In this manner, the eggs are "trayed" at the laying house and handling costs thereafter are materially reduced.

The eggs trays of the present invention are characterized by their relative durability and rigidity, as compared to the disposable molded pulp fiber trays heretofore standard in the industry. The new tray has minimum contact with the eggs so that practically all (at least 95 percent in the disclosed embodiment) of the egg surface is exposed to the flow of air thereover. Accordingly, when in the incubator, very close control of the temperature of the egg can be obtained by the high rate of heat transfer between the egg and the air.

Another advantage of the novel egg tray of the present invention is its increased capacity. It will accommodate thirty-six eggs per tray, as compared to thirty eggs per tray which has heretofore been standard for molded pulp fiber trays.

Other objects, advantages and features of the invention will appear from the following disclosure in which.

*The Egg Trays*

An important feature of the present invention resides in the structure of the egg tray shown in FIGS. 1 through 7 and in which the eggs are placed immediately after gathering in the laying house and from which they need not be removed until incubation has been substantially completed and the eggs are transferred to the hatcher. The egg tray of the present invention greatly improves on the conventional molded pulp fiber trays heretofore used and which were ordinarily discarded after a single use.

The typical prior art pulp tray required dividers between each tray, large surfaces of the egg were in contact with pulp surfaces of the tray so that free circulation of the air was not possible thereabout and the eggs had to be removed from the pulp trays and placed into special incubating trays.

According to the present invention, however, the egg trays are made of durable heat and moisture resistant, reusable material, desirably a molded plastic in which the eggs are supported on widely spaced points of contact with tray support members, substantially all of the surface of the egg being exposed to the air to provide free circulation of air about the eggs when in the incubator.

Moreover, each tray is provided with standoff feet on which one tray is supported in spaced relation to the next tray. Accordingly, no dividers are needed between stocked egg trays of the present invention. In addition to the superiority of the trays of the present invention, from the standpoint of rigidity, reusability, resistance to heat, moisture and egg washing solutions and substantially complete exposure of egg surfaces to circulating air, the trays of the present invention will hold more eggs within the name perimeter. Egg trays of the present invention will hold thirty-six eggs per tray, as distinguished from the prior art molded pulp fiber trays which hold only thirty eggs. Accordingly, more eggs can be handled at the same time and without any need for increased space in the egg shipping cartons, etc.

As shown in FIGS. 1 through 7, the tray is molded of plastic material. I prefer to use polypropylene, which is a plastic material characterized by low shrinkage and high memory. Accordingly, if the tray is deformed because of mechanical stresses, it tends to quickly return to its original configuration and is not materially affected by heat. The tray 30 consists of a perimetrical rim 31, which has a square outline in plan. The interior of the tray is subdivided into thirty-six substantially identical cells or cubicles 32 by transversely related struts 33 which intersect one with the other to form the grid pattern shown in the drawings. The rim 31 and struts 33 constitute beams of high structural strength so that the resultant framework is inherently strong and relatively rigid.

Figure 1:
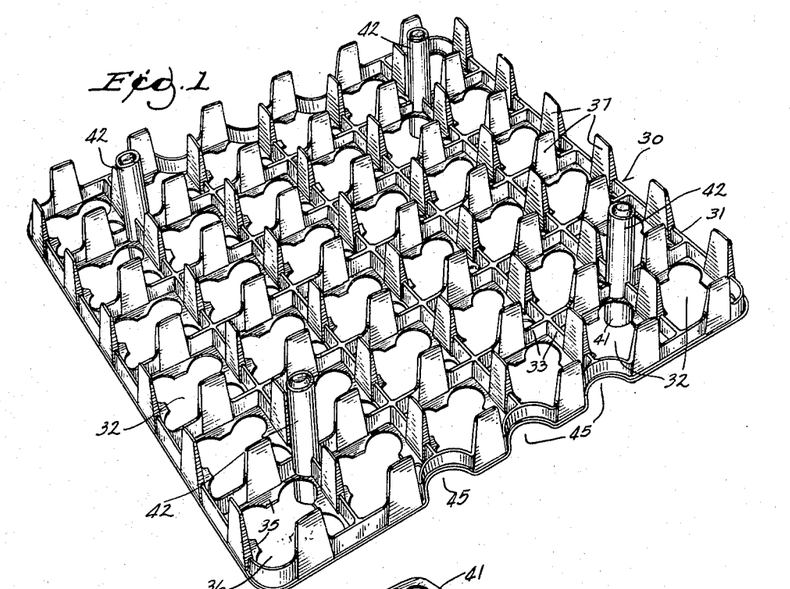
FIG. 1 is a perspective view of the new egg tray viewed from the top.
Figure 2:
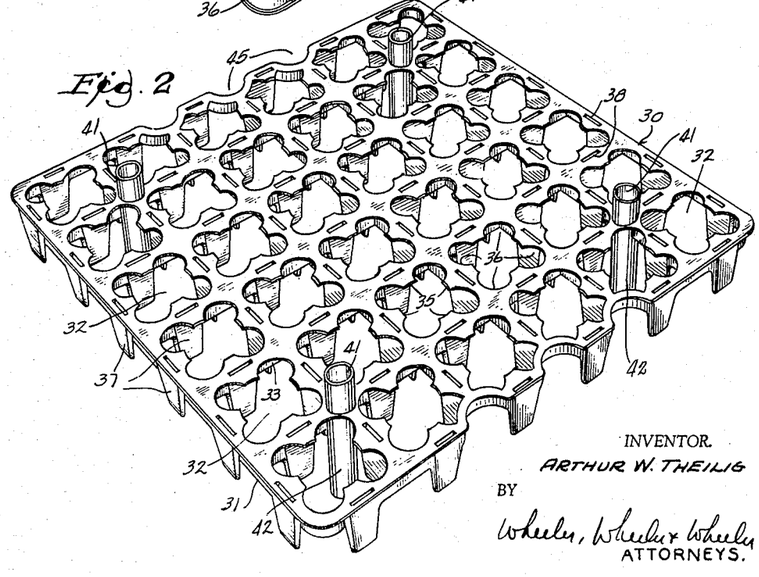
FIG. 2 is a perspective view of the new egg tray viewed from the bottom.
Figures 3, 5:
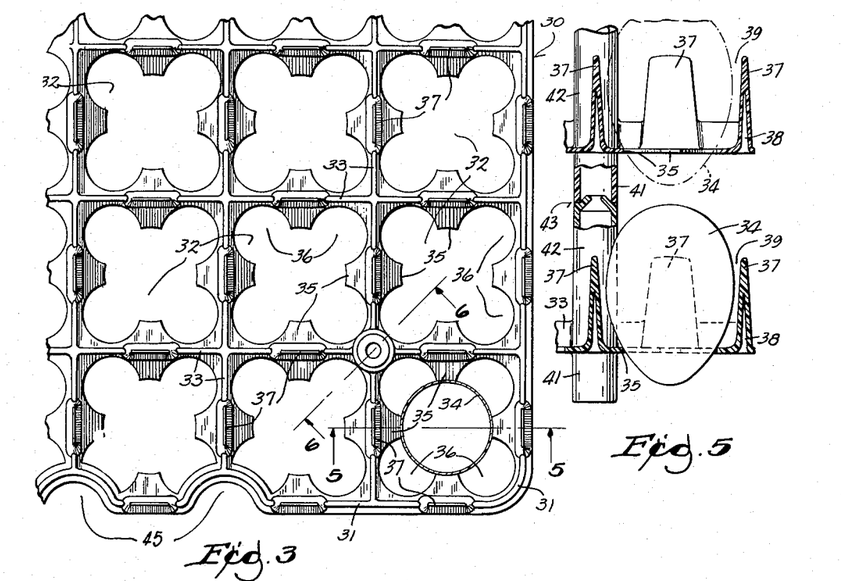
FIG. 3 is an enlarged fragmentary plan of the egg tray of FIG. 1.
FIG. 5 is a fragmentary vertical cross section taken along line 5—5 of FIG. 3 and through stacked egg trays showing the interfitting of the respective stand-off posts of the trays.
Figure 4:
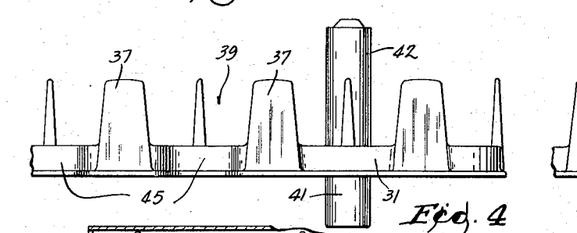
FIG. 4 is a fragmentary side elevation of the tray shown in FIG. 3.
Figure 6:
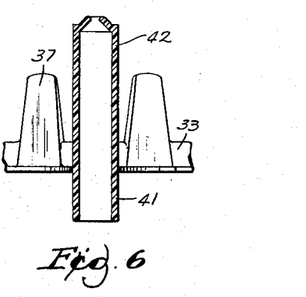
FIG. 6 is a fragmentary cross section taken along the line 6—6 of FIG. 3.

Strut and rim portions bounding the respective cells 32 have inwardly projecting fragmentary egg supporting cradle ledges 35, the facing edges of which are desirably disposed on a discontinuous circle of appropriate size to provide a support cradle for the small end of the egg 34, as shown in FIG. 5. The ledges 35 are relieved to provide passages 36 through which air may freely flow over the eggs and through the tray. Accordingly, the egg 34 has only discontinuous line contact with the edges of the ledges 35 in its normal position shown in FIG. 5 in which the small end of the egg is down and its large end is uppermost. This disposes the air sac of the egg uppermost where it should be for proper incubation of the egg.

Figure 19:
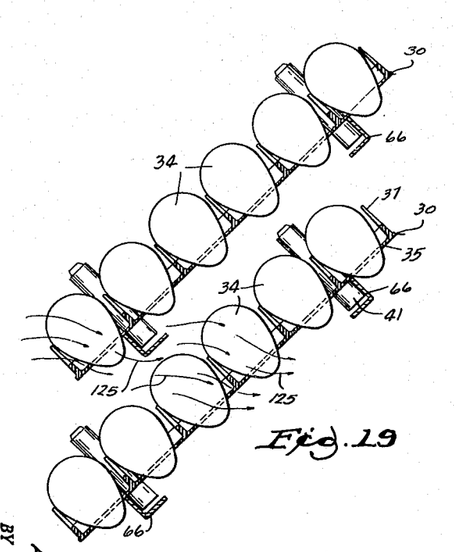
FIG. 19 is a diagrammatic view showing the air flow pattern over trayed eggs as the trays are inclined to the direction of air flow longitudinally through the incubator.

Strut and rim portions which bound the respective cells 32 are also provided with upwardly projecting fragmentary fin-like partitions 37 which extend upwardly just beyond the greatest transverse dimension through the conventional egg 34 and which prevent lateral abutment of the eggs and provide support for the eggs when the trays are tilted as shown in FIG. 19. The fragmentary partitions 37 are widely spaced, as is clear from the drawings, to provide open spaces 39 therebetween for free flow of air around the eggs. The voids 38 (FIG. 5) formed at the base of each partition 37 are optional and are provided primarily to save on plastic material in the fabrication of the trays.

To facilitate stacking one tray upon the other, each tray 30 is provided with four downwardly projecting hollow tubular legs 41 and axially aligned upwardly projecting hollow standoff legs 42. The legs 41, 42 of next adjacent trays in a stack intersect in telescopic relationship, as shown at the joint 43 of FIG. 5, so that when packed in the shipping carton 44 of FIG. 7, the eggs 34 will be properly spaced, both vertically and horizontally and protected against contact with each other and from the sides of the carton.

Figure 7:
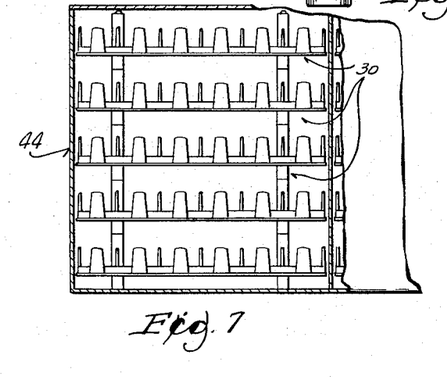
FIG. 7 is a cross section taken through a shipping carton with stacked trays embodying the invention showing how the egg trays of the present invention fit within the shipping carton.

The rim 31 of the tray 30 is desirably provided with finger grip indentation 45 to facilitate handling the tray in the course of removing it from the carton 44, placing it in the incubator racks, etc.

Egg trays fabricated according to the present invention are considerably more rigid and form-sustaining than the molded pulp fiber trays of the prior art and can be reused almost indefinitely for the transport of eggs between the laying house and the hatchery and in the incubator, as will hereinafter appear. The rigidity of the tray is attributed to the structural strength of the struts 33 and rim 31. If desired, some of the struts 33 may be of different cross section than other struts in order to provide different strength characteristics.

Inasmuch as the eggs are supported primarily on the cradle ledges 35, the respective tray cells 32 and adapted to receive eggs of almost any size typically found in laying houses. Eggs of different sizes will simply assume different positions and levels in the trays, depending upon the level at which they contact the cradle ledges 35.

*The Egg Rack*

When the eggs arrive at the hatchery in the cartons 44, the egg laden trays 30 are removed therefrom and are placed in egg racks 46, as shown in FIGS. 8 through 14. When loaded the racks are transferred to the incubator cabinet 47 shown in FIG. 15.

The racks 46 consist essentially of a skeleton frame having corner posts 50 supported on a base frame 51, the entire rack being movable on medially grooved caster wheels 52 along the floor or the tracks 53 which are on the floor of the cabinet 47.

Figure 8:
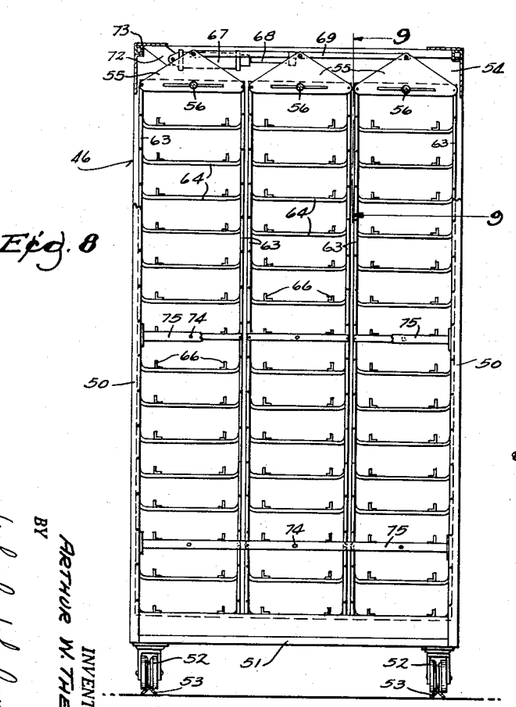
FIG. 8 is an end elevation of an egg rack in which trays of eggs are supported within the incubator cabinet.
Figure 9:
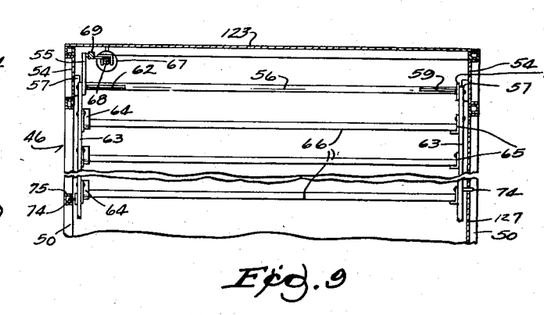
FIG. 9 is a fragmentary cross section taken along the line 9—9 of FIG. 8.
Figure 10:
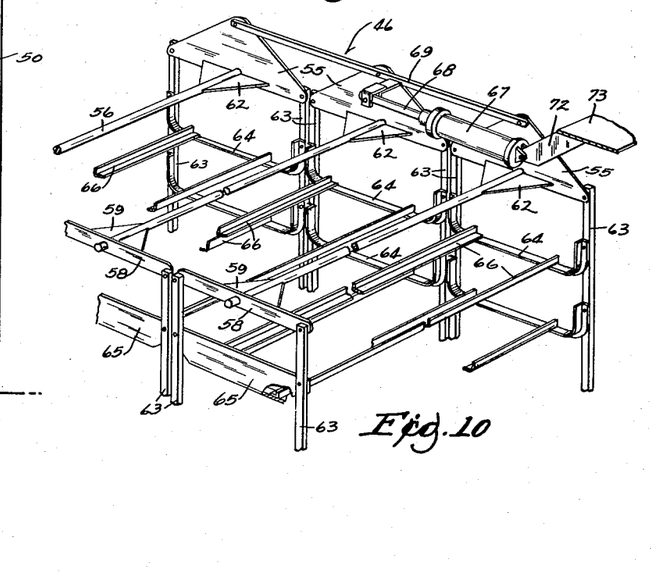
FIG. 10 is a fragmentary perspective of the rack of FIG. 8, side and top walls thereof being removed to expose details.

The respective racks 46 further comprise multiple hanger assemblies on which loaded egg trays are supported for "turning." As best shown in FIGS. 8 and 9, each rack 46 has oppositely disposed headers or cross beams 54 on which cross shafts 56 are journalled for rotation in the bearing blocks 57. These cross shafts 56 bear the weight of the turning hanger assemblies which are suspended therefrom. At corresponding respective ends of each of the cross shafts 56 there are welded or otherwise securely fastened transverse rocker arms 55, 58. The rigid connection of the arms to the cross shaft 56 is reinforced by the gusset plates 59, 62. Rocker arms 55 are triangularly shaped to function as turning cranks, as will hereinafter appear.

The respective outboard ends of the rocker arms 55, 58 pivotally suspend therefrom depending hanger rods 63. At vertically spaced levels the hanger rods 63 are pivotally connected to the hanger brackets 64, 65. Spanning between the respective hanger brackets 64, 65 are egg tray receiving tracks 66 which desirably consist of angle irons.

The hanger brackets 64, 65 and egg supporting tracks 66 are adapted to be tilted between opposite inclinations of 45° to the vertical under power of the double acting fluid motor 67, the piston 68 of which acts on the tie bar 69 which is pivotally connected to the apices of the respective triangularly shaped rocker brackets 55 thus to tilt each rocker bracket 55, 58 about the axis of its shaft 56. Fluid motor 67 is anchored on the bracket 72 which is mounted on a rack frame member 73.

Figure 16:
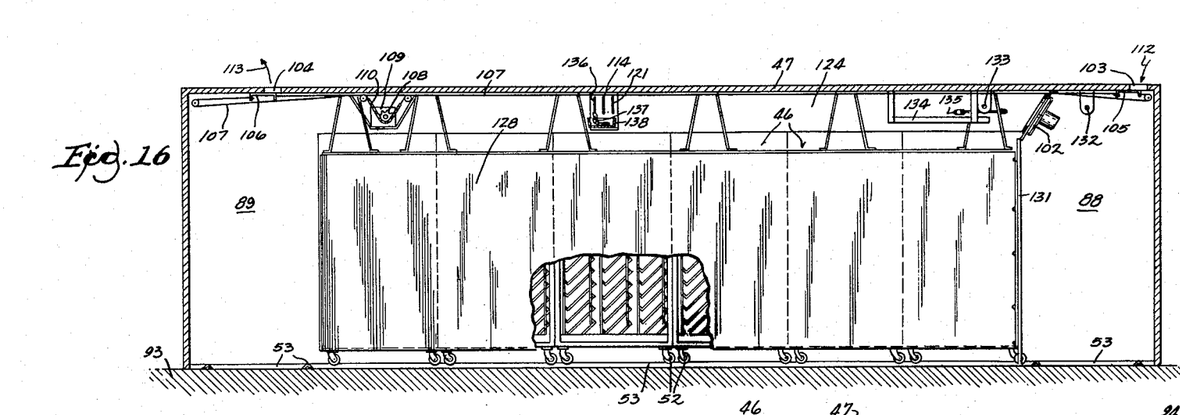
FIG. 16 is a longitudinal vertical cross section taken through the incubator of FIG. 15.

Accordingly, egg trays supported on the track 66 can be "turned" through 45° in either direction, one such position being shown fragmentarily in FIG. 16. In this way the eggs are "turned" to prevent adhesion of the embryo to the shell, as is necessary in egg incubation.

The eggs are turned about once every hour from 45° inclination at one side of the vertical to 45° inclination at the other side of the vertical. The motor 67 is accordingly energized in one direction or the other once every hour.

To stabilize the hanger assembly during this turning movement, selected hanger brackets 64, 65 are pivotally connected on pins 74 at their midpoints to cross straps 75 which are rigidly connected to the corner uprights 50. This prevents side sway of the hanger assemblies within the racks 46.

The Egg Tray Loading Pallet

Figures 11, 12, 13, 14:
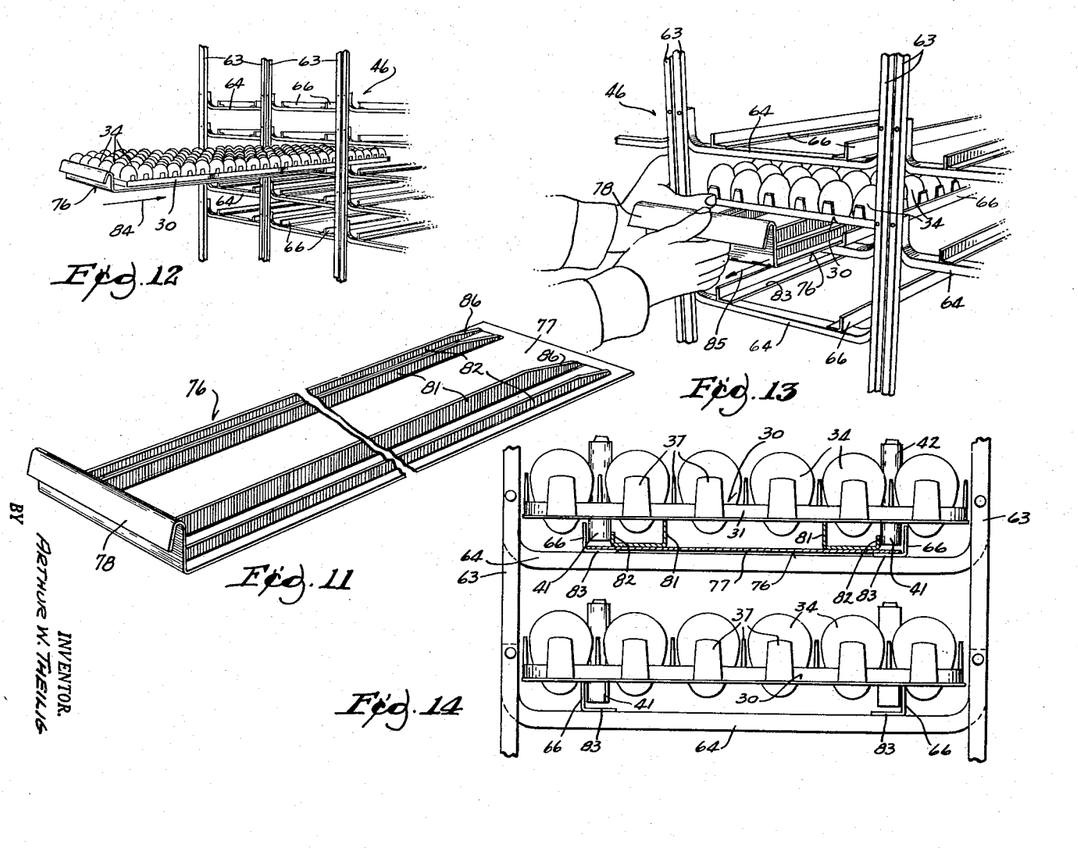
FIG. 11 is a perspective view of an egg tray pallet by which the trays may conveniently be loaded into and unloaded from the rack of FIGS. 8 through 10.
FIG. 12 is a diagrammatic view in perspective illustrating how the pallet of FIG. 11 is used to load egg trays into the rack.
FIG. 13 is a diagrammatic perspective view illustrating how the pallet is removed from beneath the trays of eggs after they have been loaded into the rack.
FIG. 14 is a diagrammatic view illustrating how the egg trays are lowered from the transfer pallet into support relationship to the tracks of the rack.

The egg trays 30 are loaded into the racks most expeditiously by use of the tray loading pallet 76 shown in FIGS. 11 through 14. The pallet consists of a sheet bed 77 with one end turned up to form a finger gripping handle 78. Slightly inwardly spaced from its side margins, the sheet bed 77 has upwardly open channel members, each having a high flange 81 and a low flange 82. As shown in FIG. 14 flanges 82 are spaced apart slightly less than the spacing of tray posts 41.

Egg laden trays 30 which have been removed from the carton 44 of FIG. 7 are set in end to end relation upon a pallet 76 and receive support from the high channel flanges 81 on which the cross struts 33 and rim 31 of the tray will rest between adjacent egg rows, as shown in FIG. 14. The downwardly extending posts 41 of the trays will embrace the low flanges 82, as is also shown in FIG. 14, thus to align the trays 30 in end to end relation on the pallet and keep them from slipping laterally.

The sheet bed 77 of the pallet is just wide enough to be received on the bottom flanges 83 between the hanger tracks 66. Accordingly, the entire egg tray laden pallet can be slid onto one set of hanger tracks as shown in FIG. 12 by slidably engaging the pallet with the tracks 66, 83 and moving it in the direction of arrow 84.

Note that the flanges 81 of the pallet 76 are high enough to hold the tray ribs and struts 31, 33 out of contact with the hanger tracks 66 while the pallet 76 is being slid onto the rack. When the egg trays 30 are completely within the rack, the operator can place his finger against the endmost tray 30, as shown in FIG. 13, and then withdraw the pallet 76 from beneath the egg trays 30 by pulling it in the direction of arrows 85.

The respective ends of the channel flanges 81, 82 are tapered at their ends, as indicated at 86. Accordingly, as the pallet is withdrawn, as shown in FIG. 13, the trays 30 will be permitted to descend by gravity until the tray is supported solely on its ribs and struts 31, 33 from the upstanding flanges of the tracks 66, as is the bottom tray in FIG. 14. Tracks 66 are spaced just wider than the spacing of tray legs 41. Accordingly, tray legs 41 are within and embraced by the track flanges 66 to prevent lateral movement, particularly during turning. Note that the tray legs are still elevated above the bottom flanges 83 of the tracks, even after the tray has settled to its position shown at the bottom of FIG. 4, the support for the tray being solely from the top edges of the flanges 66.

The egg trays 30 are removed from the racks 46 by reversing the procedure just described. The sheet bed 77 of pallet 76 is inserted in the space between tray legs 41 and bottom flanges 83 of track 66 and shoved inwardly. The trays 30 will be lifted slightly on the inclined ends 86 of the high flanges 81, so as to be transferred to the pallet 76. During this process the trays 30 will be held against longitudinal movement by reason of abutment with the hanger bracket 65. As soon as all of the egg laden trays 30 on any one track have been transferred to the pallet, it can simply be withdrawn as a unit to remove the trayed eggs therefrom, for example, when the eggs are transferred to the hatcher. It is not essential that the pallet 76 be used as the trays 30 can be inserted in the racks individually. However, the use of the pallet 76 speeds up the operation of loading and unloading the rack.

The Incubator Cabinet

The incubator cabinet 47 is shown in FIGS. 15 through 21. For the purpose of exemplification, an incubator cabinet adapted to receive twelve racks 46 is illustrated herein. In a practical embodiment of the invention such a cabinet will occupy an area of 10 feet by 27 feet, 4 inches and can incubate concurrently 77,760 eggs. Each of the egg racks 46 will contain 180 trays each containing thirty-six eggs. The racks 46 are desirably disposed in two rows each along the sides of the cabinet 47 with a central aisle 87 therebetween. The operator can walk along the aisle to inspect the eggs and make necessary adjustments in the couplings to the egg turning motors as the racks are shifted from one state of incubation to the next.

Figure 15:
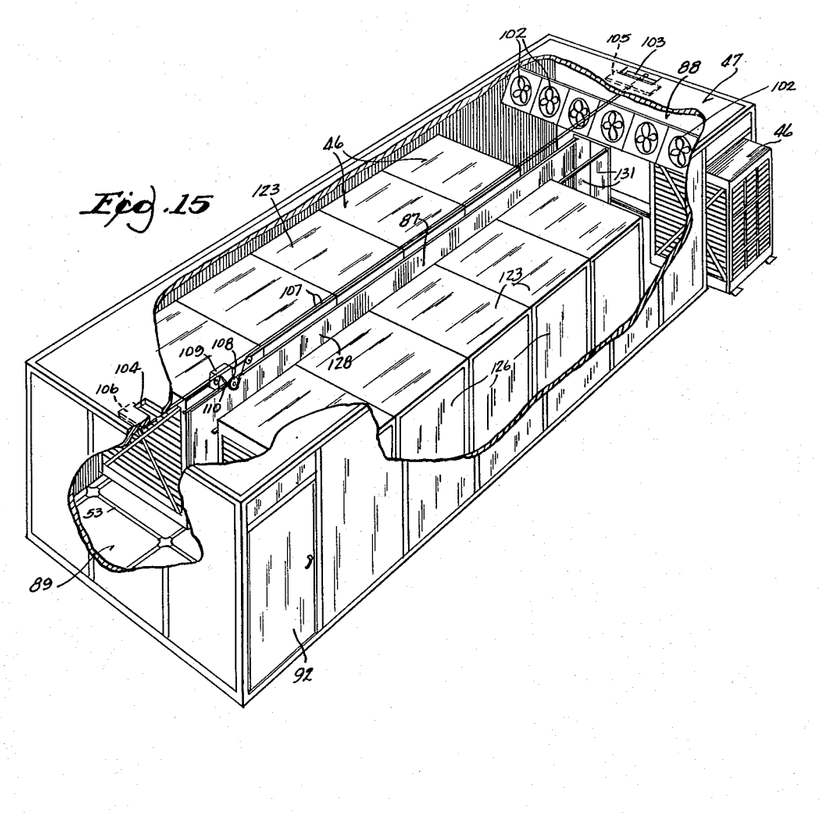
FIG. 15 is a diagrammatic perspective view of an incubator cabinet embodying the present invention with egg racks within the cabinet and in the course of movement thereinto, portions of the cabinet walls being broken away to expose the interior thereof.

At the input end of the cabinet there is a low pressure plenum chamber 88, which also functions as an inlet passage through which the racks 46 are wheeled through a doorway into the cabinet, as is shown in FIG. 15. The other or discharge end of the cabinet is provided with a high pressure plenum chamber 89, which has a door 92 from which the egg racks may be withdrawn periodically.

The cabinet 47 is conveniently made of sheet metal and may have its own floor or simply rest upon the concrete or other floor 93 of the building in which it is located. Within the cabinet 47, floor 93 supports angle tracks 53 on which the grooved rollers 52 of the racks 46 will ride. The tracks have appropriately located switches 94 on which the direction of movement of the racks can be changed. The tracks in the cabinet accurately maintain in alignment the racks 46 and guide them in their movement through the cabinet to avoid contact with the sides of the cabinet, jamming in the doorways, etc.

Figures 22, 23, 24, 25:
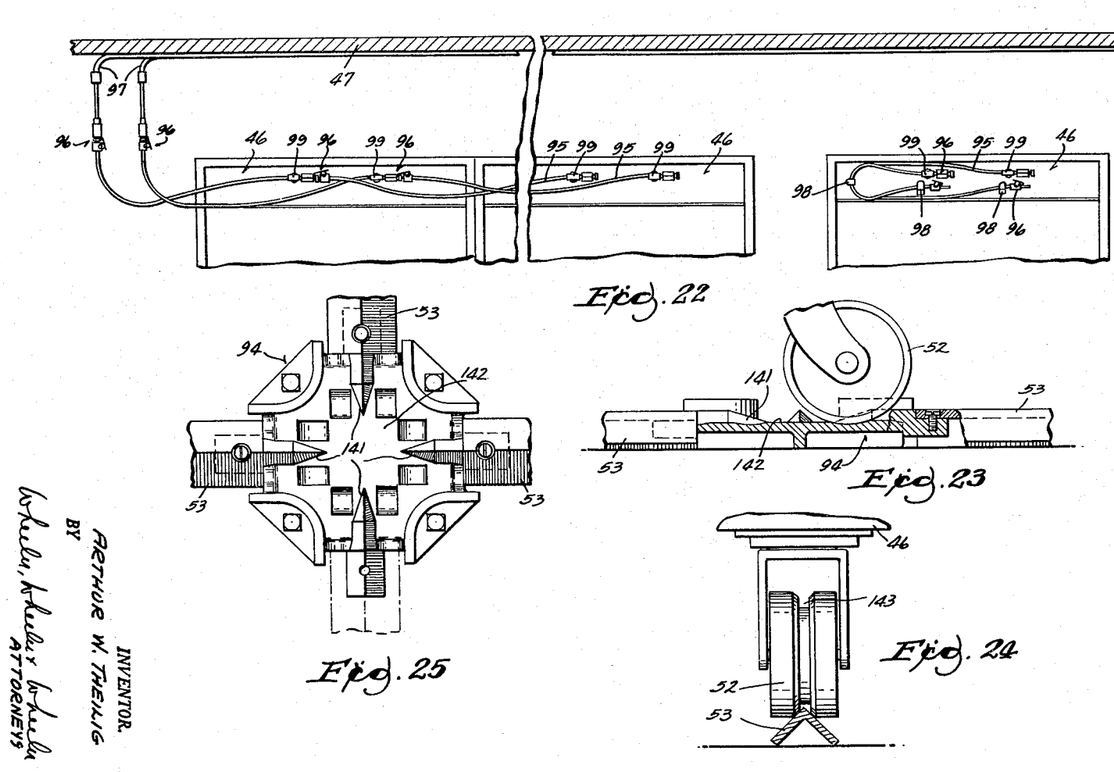
FIG. 22 is a diagrammatic view indicating the mode of interconnecting the fluid motors for the egg turning mechanism to the source of fluid pressure therefor.
FIG. 23 is a view partly in vertical cross section and partly in elevation of a track, switch and caster wheel of an egg rack.
FIG. 24 is a view partly in elevation and partly in section showing a ground wheel of a rack on its track.
FIG. 25 is a plan view of a track switch over which the racks are moved in the course of changing the direction of rack travel.

As shown in FIG. 22 each rack is provided with fluid coupling lines 95. These lines have conventional snap-on couplings 96 by which they are readily coupled to the lines on next adjacent racks and to the fluid supply lines 97 permanently fastened to the ceiling of the cabinet 47 above the aisleway 87. The lines 95 supply fluid pressure to the double acting fluid motors 67. The racks 46 are provided with keeper clips 98 in which the lines 95 and couplings 96 are secured when the rack 46 is outside of the cabinet and from which the lines are readily released for coupling to the lines 97 or to the couplings of the next adjacent rack. The respective lines 96 are connected through the couplings 99 in each rack to the respective ends of the double acting fluid motor 67. Accordingly, as the racks are moved through the cabinet 47 they are coupled one to the other for concurrent turning of their egg trays. The lines are flexible to accommodate movement and are readily uncoupled to facilitate transfer of the racks to and from the cabinet.

Figure 20:
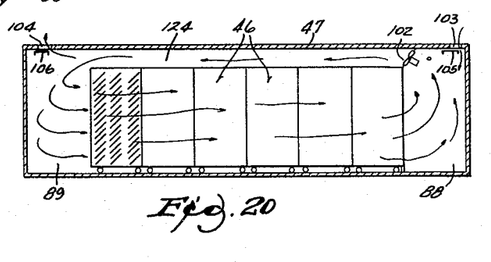
FIG. 20 is a diagrammatic view in cross section showing the air flow pattern through the incubator when the air inlet and outlet ports are set for minimum air intake.
Figure 21:
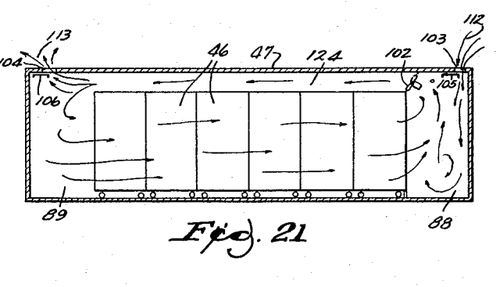
FIG. 21 is a view similar to FIG. 20, but showing the dampers for the air inlet and outlet ports in a more widely open position.

Low pressure plenum chamber 88 is provided along a top corner thereof with a series of blower fans 102 which circulate air throughout the cabinet 47 on the path indicated by the arrows in FIGS. 20 and 21. The low pressure plenum is provided with an inlet air port 103 and the high pressure plenum is provided with an outlet air port 104. Dampers 105, 106, which concurrently are slidable across the ports 103, 104 to correspondingly change the degree of opening thereof are connected by an endless cable 107 having a chain section 110 driven from the sprocket 108 on the damper control motor 109. The motor 109 is subject to a temperature controller which can be conventional or similar to the one shown in my copending application Serial No. 654,828, filed April 24, 1957, now U.S. Patent 3,056,353 granted October 2, 1962. Its detail need not be repeated here. Essentially the controller is responsive to a thermostat 114. When the thermostat calls for heat the heating element 132 is energized and motor 109 is energized to move the dampers 105, 106 toward closed position. When heat demand has been satisfied the controller will deenergize heating element 132 and reverse the motor 109 to move the dampers 105, 106 toward open positions. The cycle of the motor is very slow. It takes thirty-eight minutes for it to move the dampers between their extreme positions, even when constantly energized to move in one direction. In normal operation it will reverse periodically and the dampers 105, 106 will have a relatively narrow range. This will depend on outside temperature, how many eggs are in the cabinet, etc. In my prior application aforesaid the heating element is interlocked against energizations except when the damper is at its minimum position. I prefer to omit the interlock in applying the controller to the incubator of the present invention. This is because the cabinet 47 herein is subject to sudden heat loss when the racks are transferred and I wish the heater 132 to more quickly respond to the thermostat 114.

At the minimum open position of dampers 105, 106, there will be a ⅝ inch opening in the ports 103, 104, thus to admit sufficient fresh air into the chamber 47 to supply the demand of the eggs for oxygen, even when there is a demand for heat. If the dampers are opened beyond their minimum setting, additional outside air will be drawn into the low pressure plenum 88, as shown by the arrows 112, and air in greater quantity will be discharged from the port 104 in the high pressure plenum 89, as shown by the arrows 113.

Accordingly, the temperature of the air within the cabinet 47 can be closely controlled by adjusting the position of the dampers 105, 106 to admit large or small quantities of outside air and concurrently controlling the heat element 132. Auxiliary heat element 133 is provided with its own thermostat 121 set at ²⁄₁₀ of a degree F. below thermostat 114, thus to furnish added heat if there is a radical heat drop in the cabinet.

In incubator operations the twelve racks 46 help channel the air flow as shown in FIGS. 20, 21. The tops 123 of the racks 46 form with the top wall of the cabinet 47 an air passage 124 shown in FIGS. 20, 21, along which the air impelled by the fans 102 will travel to the high pressure plenum 89.

After entering the high pressure plenum 89, the air will follow the path of the arrows shown in FIGS. 20, 21 and return to the low pressure plenum 88 through the racks 46 and will flow over any eggs therewithin as shown in FIG. 19. While in the cabinet 47 the trays 30 are always tilted in the same direction. This is changed to the opposite direction once per hour. In any event the eggs will be disposed with their major axes at a 45° angle to the vertical by reason of the egg turning mechanism hereinbefore described, and the air will flow around the eggs, both along their major and minor axes, as indicated by the arrows 125. When the eggs are tilted, as shown in FIG. 19, they will ordinarily shift slightly in the cradle ledges 35 to lean against and receive support from the partitions 37. However, the area of contact is extremely small and the air will freely pass over almost the entire surface of the egg, the only egg surfaces which are not exposed to a moving current of air being those surfaces in line contact with the edges of the cradle ledges 35 and the tiny area on the egg side which touches the partition 37 against which it rests. Accordingly, practically all of the egg surface is exposed to the circulating air. The exposure exceeds ninety-five percent.

When the egg turning mechanism tilts the trays 30 in the direction opposite to which they are shown in FIG. 19, the air will pass over the eggs at an incline to their major and minor axes, but in a direction just opposite arrows 125. Regardless of the direction of incline the open spaces 36, 39 in the egg tray 30 facilitate the flow of air around the eggs.

To confine the air flow through the interior rack portions which contain the eggs, the racks 46 have in addition to top wall 123 a bottom wall 126 and one side wall 127 which is parallel to and next adjacent the side walls of the cabinet 47. The sides of the racks in the stream of air are open and the side of the racks opposite wall 127 does not have any permanent wall, as it is desired that this side be open for loading and inspection of the eggs. However, to confine the air flow within the interior of the racks, canvas curtains 128 are hung at both sides of the aisle 87. Inasmuch as the insides of the racks 46 are exposed to the low pressure plenum 88, the curtains will be drawn relatively tight against the aisle sides of the racks to substantially seal these sides of the racks.

The end of the aisle adjacent low pressure plenum 88 is sealed by the doors 131. These doors may be opened to admit the operator to the aisle 87 while the eggs are incubating.

*Operation of Incubator*

Figure 17:
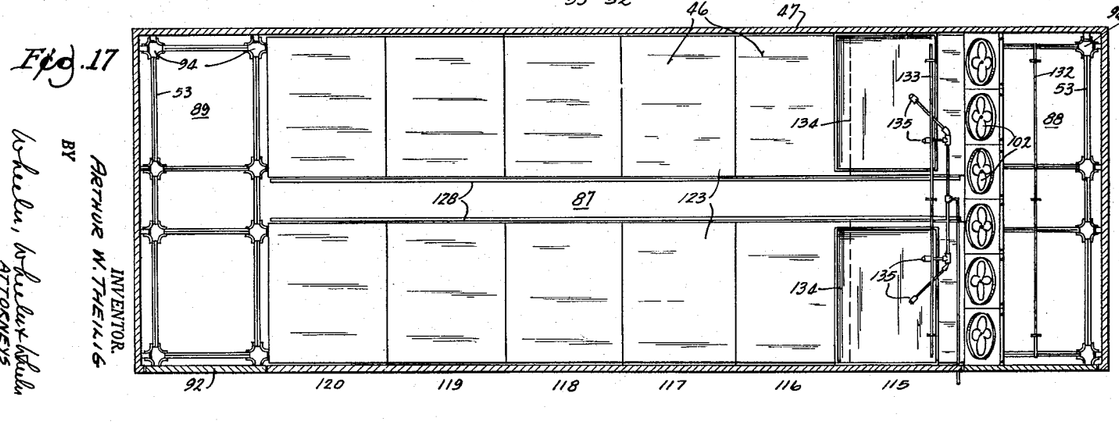
FIG. 17 is a horizontal cross section taken through the incubator of FIG. 15.
Figure 18:
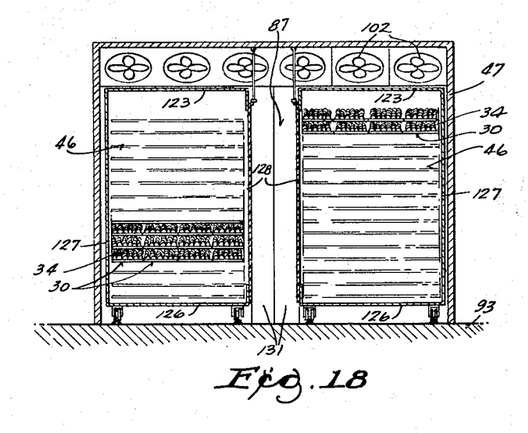
FIG. 18 is a transverse vertical cross section taken through the incubator of FIG. 15.

Assuming a three day interval between the setting of each batch or stage of eggs in the incubator and the incubation of chicken eggs which require eighteen days in the incubator and an additional three days in the hatcher, for a total incubation period of twenty-one days, the incubator is initially put into operation on the first day of the incubation cycle by rolling fully loaded racks 46 of freshly laid eggs into incubator stations 115, as shown in FIG. 17. Under the assumed conditions aforesaid the racks 46 at the other stations 116–120 will be empty of eggs. The two egg racks at opposite sides of the aisle at rack station 115 will remain at station 115 for three days and then are shifted longitudinally of the cabinet 47 into rack station 116. This is done by rolling all the racks longitudinally of the cabinet on their tracks 53. The racks 46 formerly at egg rack station 120 are removed from the incubator through the door 92, and two additional racks 46 with freshly set eggs are positioned at rack station 115 by rolling them into the incubator through the door of the low pressure plenum chamber 88, as shown in FIG. 15. Every three days, two racks of freshly set eggs are positioned at station 115 and the previously set and partially incubated eggs are transferred progressively from station 116 through station 120.

When the incubator is completely filled with eggs, those eggs in the racks at station 115 will have been in the incubator from one to three days, the eggs at station 116 will have been in the incubator from four to six days, the eggs at station 117 will have been in the incubator from seven to nine days, the eggs at station 118 will have been in the incubator from ten to twelve days, the eggs at station 119 will have been in the incubator from thirteen to fifteen days, and the eggs at station 120 will have been in the incubator from sixteen to eighteen days. Those eggs in the incubator less than fourteen days are in the heat absorbing early stage and those in the incubator more than fourteen days will be in the heat releasing late stage.

After eighteen days when the racks at station 120 are removed from the incubator to make room for freshly set eggs at station 115, the eighteen day old eggs are removed from the trays 30 and are placed in a hatcher. The hatcher uses a different kind of a tray in which the eggs are laid on their sides preparatory to hatch and in which the chicks can move around after hatching. The incubator is now in full operation with eggs in six different positions, those nearest high pressure plenum 89 being late stage eggs and those nearest low pressure plenum 88 being early stage eggs.

The air flow pattern shown in FIGS. 20, 21 and the periodic shifting of the racks longitudinally of the cabinet 47 against the flow of air is a great advantage in the incubation method of the invention. Eggs in the early stages of incubation require heat to maintain them at proper temperature while eggs in the late stages of incubation give off heat. Moreover, in the late stages of incubation, eggs require more oxygen than those in the early stages of incubation. The air flow pattern of the present invention is such as to supply air having more oxygen to the eggs in the late stages of incubation and also transfers heat from the late stage eggs which are giving off heat to the eggs in the early stages of incubation and which are absorbing heat. This technique materially reduces the heat load of the incubator.

Close control is here maintained over the temperature of the eggs in the several stages of incubation, as distinguished from prior art multi-stage incubators in which it is possible only to control the average temperature. Precise control is achieved here without need for elaborate equipment simply because the air flow pattern is made to conform to the desired transfer of heat from late stage eggs to early stage eggs.

For example, for chicken eggs, all eggs in the incubator should have an internal temperature of 99.5° F. The late stage eggs at stations 119 and 120 will have an external temperature of 100° F., because they are giving off heat. The early stage eggs at stations 115–118 will have an external temperature of 99° F., because they are absorbing heat. The control system will be responsive to the thermostat 114 to maintain the temperature of the air flowing in passage 124 at 99° F. An aforesaid, this is controlled by admission of cooling air through the inlet port 103 and the discharge of heated air through the port 104 and by control of the electric heat element 132 which is the low pressure chamber 88 and heat element 133, which is in the passage 124. Inasmuch as all of the air which is circulated, except that which is discharged through port 104, is required to flow through all of the racks in the pattern of FIGS. 20, 21 in which the air successively flows over the eggs in racks 120, 119, 118, 117, 116, 115 and into the low pressure plenum 88, the 99° air which flows over the last stage eggs at 100° will pick up heat from the late stage eggs to drop their temperature toward the optimum 99.5° F. This air increases its temperature above 99.5° and continues through the incubator to flow over the early stage eggs. Accordingly, the air flow pattern will transfer heat from the late stage eggs to the early stage eggs. The early stage eggs at 99° F. will tend to increase in temperature toward 99.5° F.

As is conventional, the air within the cabinet 47 is maintained at the proper humidity by disposing in the passage 124, water pans 134 which are beneath the water supply nozzles 135. Nozzles 135 are under control of the humidistat 136, which has a wet bulb and a wick 137 in a water pan 138 (FIG. 16) and a conventional control circuit to a valve supplying the nozzles 135.

The cabinets 47 can be made of sheet metal or the like for erection in existing buildings. Alternatively, special buildings can be erected to receive the racks 46 and such buildings constructed with the exact dimensions necessary to receive racks 46 so that the walls of the building itself function as a cabinet 47. In any case, the tracks 53 are laid on the floor of the cabinet and the turning switches 94 are provided in both the chambers 88, 89 to guide the racks in their change of direction in the course of their movement through the incubator.

As shown in FIG. 25, the track switches 94 have four tapered lead in segments 141 which align with the tracks 53 and are disposed about a central plateau 142 in which the wheel 52 of the rack is free to turn in any direction as urged by the operator. Accordingly, when rolled onto the plateau 142, the caster wheels 52 will follow any track segment 141 into which its groove 143 is urged. When away from any track 53 the ungrooved portions of the wheel 52 will simply roll on the floor and function as a conventional castor wheel for transport of the rack.

The cabinet 47 is desirably insulated to minimize heat exchange with the surrounding atmosphere.

While the method of invention is believed to be clear from the foregoing disclosure it may be summarized as follows: Eggs in early and late stages of incubation are arranged serially along a path of airflow in which the air flows from the late stage eggs to the early stage eggs to transfer heat generated by late stage eggs to the early stage eggs which are absorbing heat. The eggs are periodically shifted against the flow of air as freshly set eggs are added to the serial arrangement at the end of the airflow path and late stage eggs are removed from the beginning of the airflow path. After the incubator cabinet has been completely filled with eggs, newly set eggs are added periodically, in the foregoing example, once every three days, and the late stage eggs are concurrently removed.

I claim:

1. An egg tray comprising intersecting transversely related relatively rigid struts interconnected in a substantially square grid pattern to define multiple egg receiving cells, strut portions bounding respective cells having inwardly projecting egg supporting cradle ledges to receive the small end of the egg and upwardly projecting partitions to intervene between eggs in adjacent cells, the respective cradle ledges and partitions being spaced apart to permit free air circulation about eggs in said cells along both the major and minor axes of the eggs and through the tray.

2. The egg tray of claim 1 in which all parts thereof comprise molded plastic.

3. The egg tray of claim 1 in which all parts thereof comprise molded polypropylene.

4. The egg tray of claim 1 in which certain of said struts are provided at their intersections with upwardly and downwardly extending standoff legs for stacking one tray on another.

5. The combination of an egg rack having multiple egg tray receiving compartments comprising substantially parallel tracks, a plurality of egg holding trays receivable on said tracks in end to end relation, and an egg rack-charging pallet for concurrently loading said plurality of trays in end to end relation onto said tracks, said pallet having tracks which have a vertical height greater than the tracks of the racks, said pallet also having a bed slidable on the rack tracks so that a pallet loaded with said plurality of trays can be slid onto the tracks of the rack and then withdrawn from beneath the trays which will descend by gravity onto the rack tracks after the pallet is removed.

6. The apparatus of claim 5 in which the tracks of the pallet have inclined ends up which the trays will lift when the pallet is inserted beneath the trays and onto the rack tracks to transfer the trays from the racks to the pallet.

7. The apparatus of claim 5 in which the trays have legs which are spaced apart to a different extent than the tracks of the racks whereby one of the tracks and legs embrace the other to prevent lateral shifting of the trays when on the tracks.

8. The apparatus of claim 5 in which the trays have legs which are spaced apart to a different extent than the tracks of the pallet whereby one of the legs and tracks embrace the other to prevent lateral shifting of the trays when supported on the pallet.

9. The apparatus of claim 5 in which the trays have legs which are of less height than the height of the rack tracks to leave a space between the legs and the rack tracks.

References Cited in the file of this patent

UNITED STATES PATENTS

| | | |
|---|---|---|
| 537,682 | Haines | Apr. 16, 1895 |
| 940,878 | Jones et al. | Nov. 23, 1909 |
| 2,149,034 | Thom | Feb. 28, 1939 |
| 2,163,129 | Molleson | June 20, 1939 |
| 2,255,036 | Gedge | Sept. 9, 1941 |
| 2,281,339 | Taggart | Apr. 28, 1942 |
| 2,325,140 | Lindberg | July 27, 1943 |
| 3,078,020 | Boonstra | Feb. 19, 1963 |